United States Patent
Xiong et al.

(10) Patent No.: US 11,075,833 B2
(45) Date of Patent: Jul. 27, 2021

(54) PACKET FORWARDING METHOD AND NODE DEVICE BASED ON BIER-TE, AND STORAGE MEDIUM

(71) Applicant: ZTE CORPORATION, Guangdong (CN)

(72) Inventors: Quan Xiong, Guangdong (CN); Zheng Zhang, Guangdong (CN); Fangwei Hu, Guangdong (CN); Jinghai Yu, Guangdong (CN)

(73) Assignee: ZTE CORPORATION

( * ) Notice: Subject to any disclaimer, the term of this patent is extended or adjusted under 35 U.S.C. 154(b) by 17 days.

(21) Appl. No.: 16/630,009

(22) PCT Filed: Jul. 11, 2018

(86) PCT No.: PCT/CN2018/095270
§ 371 (c)(1),
(2) Date: Jan. 10, 2020

(87) PCT Pub. No.: WO2019/011272
PCT Pub. Date: Jan. 17, 2019

(65) Prior Publication Data
US 2021/0092046 A1    Mar. 25, 2021

(30) Foreign Application Priority Data

Jul. 11, 2017 (CN) .......................... 201710561153.7

(51) Int. Cl.
| | | |
|---|---|---|
| G06F 15/16 | (2006.01) | |
| H04L 12/761 | (2013.01) | |
| H04L 12/755 | (2013.01) | |
| H04L 12/715 | (2013.01) | |
| H04L 12/723 | (2013.01) | |
| H04L 12/927 | (2013.01) | |

(52) U.S. Cl.
CPC ............ *H04L 45/16* (2013.01); *H04L 45/021* (2013.01); *H04L 45/04* (2013.01); *H04L 45/507* (2013.01); *H04L 47/806* (2013.01)

(58) Field of Classification Search
CPC ....... H04L 45/16; H04L 45/021; H04L 45/04; H04L 45/507; H04L 47/806
See application file for complete search history.

(56) References Cited

U.S. PATENT DOCUMENTS

| | | | | |
|---|---|---|---|---|
| 9,369,371 | B2* | 6/2016 | Filsfils | H04L 43/50 |
| 9,401,858 | B2* | 7/2016 | Francois | H04L 45/28 |
| 9,438,432 | B2* | 9/2016 | Shepherd | H04L 45/50 |
| 9,537,769 | B2* | 1/2017 | Bryant | H04L 45/50 |
| 9,749,227 | B2* | 8/2017 | Frost | H04L 41/00 |

(Continued)

OTHER PUBLICATIONS

Chen et al., BIER-TE Ping and Trace draft-chen-bier-te-ping-01, Oct. 7, 2016 (Year: 2016).*

(Continued)

*Primary Examiner* — Hieu T Hoang
(74) *Attorney, Agent, or Firm* — McDonald Hopkins LLC

(57) ABSTRACT

Provided are a packet forwarding method based on BIER-TE, a node device and a storage medium. The method includes: acquiring X bit string sub-package structures from a BIER-TE based message; and forwarding the message according to the X bit string sub-package structures, where X is greater than or equal to 1.

18 Claims, 6 Drawing Sheets

(56) References Cited

U.S. PATENT DOCUMENTS

| | | | | |
|---|---|---|---|---|
| 9,762,488 B2* | 9/2017 | Previdi | ................ | H04L 45/745 |
| 10,122,614 B2* | 11/2018 | Eckert | .................... | H04L 45/28 |
| 10,225,090 B2* | 3/2019 | Wijnands | ............ | H04L 12/1886 |
| 2016/0127139 A1 | 5/2016 | Tian et al. | | |
| 2016/0127142 A1 | 5/2016 | Tian et al. | | |

OTHER PUBLICATIONS

Huawei et al., "Traffic Engineering for Bit Index Explicit Replication BIER-TE." draft-eckert-bier-te-arch-05 Network Working Group Internet-Draft Intended Status: Standards Track, Jun. 21, 2017.
Zte Corporation, "BIER-TE Encapsulation." draft-xiong-bier-te-encapsulation-00.txt BIER WG Internet-Draft Intended Status: Standards Track, Jul. 18, 2017.
Patent Cooperation Treaty (PCT), International Search Report and Written Opinion for Application PCT/CN2018/095270, filed on Jul. 11, 2018, dated Sep. 25, 2018, International Searching Authority, CN.

* cited by examiner

BitString-TLV1 (SubDomain = 1, BSL =8, SI = 0)
BitString-TLV2 (SubDomain = 1, BSL =8, SI = 1)

PACKET FORWARDING METHOD AND NODE DEVICE BASED ON BIER-TE, AND STORAGE MEDIUM

CROSS-REFERENCE TO RELATED APPLICATION

This application is a 35 U.S.C. 371 national stage filing of PCT Application No. PCT/CN2018/095270 filed on Jul. 11, 2018, which claims priority to Chinese patent application No. 201710561153.7 filed on Jul. 11, 2017, disclosure of which are incorporated herein by reference in their entirety.

TECHNICAL FIELD

The present disclosure relates to the field of network communications and, in particular, to a packet forwarding method and node device based on bit indexed explicit replication-traffic engineering (BIER-TE), and a storage medium.

BACKGROUND

The bit indexed explicit replication (BIER) is a multicast data forwarding technology that divides a multicast network into BIER domains. The BIER domain includes bit-forwarding ingress routers (BFIRs) and bit-forwarding egress routers (BFERs). The technology uses a bit position (BP) to identify a destination node, and uses a bit-forwarding forwarding router (BFR) to generate a bit index forwarding table (BIFT) according to a routing table and BIER information. The BFR forwards and replicates a multicast message according to a bit string (BST) and the BIFT.

The forwarding table in the BIER technology is generated based on the routing table, and only can specify which BFERs need to receive the message, but cannot explicitly specify a forwarding path of the message. Therefore, in the process of multicast message forwarding and replication, it is difficult to ensure that the forwarding path from a source node to each destination node is optimal. In order to resolve this problem, as shown in FIG. 1, in the BIER-TE, links and link sets between each adjacent node are uniformly called the adjacency, and a corresponding BP is defined for the adjacency. The BIER-TE no longer uses the BP in the BST to identify the destination node, but uses the BP in the BST to identify one or more adjacencies, and generates the forwarding table according to the BP. The adjacency is divided into four types, that is, Forward Connected, Forward Routed, ECMP and Local Decap.

According to requirements of a BIER package format, when a multicast flow is transmitted in a BIER network, an additional specific BIER head needs to be packaged, and this message head carries the BST. When the multicast flow is received, the BFR searches BPs in the BST and forwards the message to one or more corresponding adjacencies. The bit string length (BSL) determines the number of adjacencies. In the network, the BSL is limited, and when the network scale is extended, in order to improve network forwarding efficiency, the BIER domain is further divided into sub-domains (SDs), and at the same time, the sub-domain is further divided by using a set identifier (SI). Therefore, the BST and <SD:BSL:SI> determine an adjacency set forwarded in the message, to ensure that the flow can be sent to all destination nodes through optimal paths.

From a BFIR to each BFER, the BIER-TE multicast flow needs to pass multiple adjacencies. Therefore, the BPs allocated by all adjacencies passed by the path from the BFIR to a certain BFER must belong to a same <SD:BSL:SI> set, so as to ensure that the message is forwarded to the BFER in a BST. This package format limits flexibility of both SI:BP allocation and message forwarding. When the network scale is extended, the number of all adjacencies passed by the path from the BFIR to a certain BFER is very large, which may not ensure that the BPs belong to the same <SD:BSL:SI> set, such that the message cannot be packaged into a BST message, causing the multicast message forwarding interruption or failure. At the same time, the BPs of all adjacencies passed by all paths from the BFIR to the BFER must be split into multiple BSTs to be forwarded in the message with <SD:BSL:SI> as an index, which increases times of message replication and forwarding and seriously affects multicast message forwarding efficiency.

SUMMARY

The present disclosure provides a packet forwarding method and node device based on BIER-TE, and a storage medium.

Embodiments of the present disclosure provide a packet forwarding method based on BIER-TE. The method includes steps described below.

X BST sub-package structures are acquired from a BIER-TE message.

The message is forwarded according to the X BST sub-package structures, where X is greater than or equal to 1.

The embodiments of the present disclosure further provide a packet forwarding node device based on BIER-TE. The device includes a memory and a processor. The memory is configured to store BIER-TE-based message forwarding computer programs, and the processor is configured to execute the computer programs to implement steps described below.

X BST sub-package structures are acquired from a BIER-TE message.

The message is forwarded according to the X BST sub-package structures, where X is greater than or equal to 1.

The embodiments of the present disclosure further provide a computer-readable storage medium. The computer-readable storage medium is configured to store BIER-TE-based message forwarding computer programs for executing steps of the above-mentioned method when executed by a processor.

The embodiments of present disclosure have beneficial effects described below.

The method, the device and the storage medium in the embodiments of the present disclosure acquire X BST sub-package structures from a BIER-TE message and forward the message according to the X BST sub-package structures, thereby implementing a new message package format, making the BIER message carry multiple BSTs, overcoming the limitation in which one BIER message must have the same index parameter and BST, effectively resolving the problem of limited resource allocation in the BST in the BIER-TE, improving flexibility of message package and being compatible with the BIER forwarding method, thus improving the message forwarding efficiency.

DETAILED DESCRIPTION

In order to solve the problem in the related art, the embodiments of the present disclosure provide a packet forwarding method based on BIER-TE, a node device and a storage medium.

The present disclosure will be described hereinafter in detail in conjunction with the drawings and embodiments. It is to be understood that specific embodiments described herein are intended to explain the present disclosure, and not to limit the present disclosure.

Embodiment One

Figure 2:
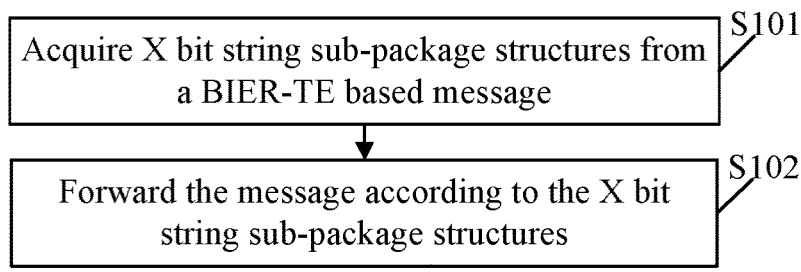
FIG. 2 is a flowchart of a packet forwarding method based on BIER-TE according to an embodiment of the present disclosure.

This embodiment provides a packet forwarding method based on BIER-TE. As shown in FIG. 2, the method includes steps S101 and S102 described below.

In S101, X BST sub-package structures are acquired from a BIER-TE message.

In S102, the message is forwarded according to the X BST sub-package structures, where X is greater than or equal to 1.

This embodiment acquires X BST sub-package structures from a BIER-TE message and forwards the message according to the X BST sub-package structures, thereby implementing a new message package format, making the BIER message carry multiple BSTs, overcoming the limitation in which one BIER message must have the same index parameter (<SD:BSL:SI>) and BST, effectively resolving the problem of limited resource allocation in the BST in the BIER-TE, and improving flexibility of message package, thus improving message forwarding efficiency.

On the basis of the above embodiment, variant embodiments of the above embodiment are further proposed, and it is to be noted that herein, for the brevity of description, only differences from the above embodiment will be described in the variant embodiments.

It is to be noted that prefixes such as "first", "second", etc. used to distinguish elements in the embodiments of the present disclosure are merely used to facilitate the description of the present disclosure, and have no particular meaning in themselves.

In one embodiment, the BST sub-package structure is a BST sub-type length value (TLV).

Before the X BST sub-package structures are acquired from the BIER-TE message, the method further includes steps described below.

A BST linked list for forwarding the message is acquired.

X BST sub-TLVs are generated according to the BST linked list.

The X BST sub-TLVs are packaged in the BIER message.

Specifically, the step in which the X BST sub-TLVs are packaged in the BIER message includes a step described below.

The X BST sub-TLVs are packaged in a preset extension area of the BIER message.

In one embodiment, Y BST sub-TLVs correspond to a BST corresponding to a set of index parameters, where Y is greater than or equal to 1, and Y is less than or equal to X; the set of index parameters is a set composed of SDs, BSLs and SIs, or is a BIER message forwarding table identifier corresponding to the BST; and each BP in the BST identifies one or more adjacencies.

An optional embodiment of the present disclosure provides a BIER-TE-based package format. The package format can carry multiple BSTs. The package format extends and is compatible with the BIER package format and can be packaged in an MPLS message and a non-MPLS message. In the MPLS message package, a BIER header is packaged before a payload of the MPLS message and disposed at the bottom of an MPLS label stack.

Through the manner of extending the BST sub-TLV in the BIER package format provided in the optional embodiment of the present disclosure, one BIER package message can carry multiple BTS sub-TLVs, and one or more TLVs correspond to BSTs of a <SD:SI:BSL> set.

Furthermore, the BIER message can carry multiple BSTs, the limitation in which one BIER message must have the same index parameter and BST is overcame, the problem of limited resource allocation in the BST in the BIER-TE is effectively resolved, and the flexibility of message package is improved, thereby improving the message forwarding efficiency.

Furthermore, the BIER message forwarding table identifier uniquely corresponds to a set composed of SDs, BSLs and SIs.

Specifically, any one of the BST sub-TLVs includes a sub-BST and the BIER message forwarding table identifier, or includes a sub-BST and at least one index parameter in the set composed of SDs, BSLs and SIs; and Y sub-BSTs compose one BST.

The at least one index parameter includes an SD (e.g., an SD identifier (ID)), a BSL and an SI, or includes an SD and an SI, or includes an SI and a BSL, or includes an SI.

Furthermore, when the number of index parameters in the BST sub-TLV is less than 3, the set of index parameters is determined by the BIER message forwarding table identifier, the BSL and/or the SI carried by the BIER message. In this embodiment, information, such as the BIER message forwarding table identifier, the BSL and/or the SI carried by the BIER message, is not packed in the BST sub-TLV, but packaged a package area other than the BST sub-TLVs in the BIER message, and the information is information carried by the BIER message itself. A certain piece of information carried by the BIER message described below is in the same sense as the above information and also refers to information carrier in the package area other than the BST sub-TLVs in the BIER message.

Specifically, the step in which when the number of index parameters in the BST sub-TLV is less than 3, the set of index parameters is determined by the BIER message forwarding table identifier, BSL information and/or the SI carried by the BIER message includes steps described below.

When an index parameter in the BST sub-TLV is an SD and an SI, the BSL in the set of index parameters is set by the BSL information carried by the BIER message.

When an index parameter in the BST sub-TLV is an SD and a BSL, the SD in the set of index parameters is set by the BIER message forwarding table identifier carried by the BIER message. When an index parameter in the BST sub-TLV is an SI, the BSL in the set of index parameters is set by the BIER information carried by BIER message, and the SD in the set of index parameters is set by the BIER message forwarding table identifier carried by the BIER message. When the BSL in the set of index parameters is set by the BSL information carried by the BIER message, all BST sub-TLVs in each BIER message have the same BSL.

When the SD in the set of index parameters is set by the BIER message forwarding table identifier carried by the BIER message, all BST sub-TLVs in each BIER message have the same SI.

When the BSL in the set of index parameters is set by the BSL information carried by the BIER message, and when the SD in the set of index parameters is set by the BIER message forwarding table identifier carried by the BIER message, all BST sub-TLVs in each BIER message have the same BSL and the same SD.

Optionally, a length of the sub-BST is variable or fixed.

When the length of the sub-BST is variable, Y is equal to 1.

When the length of the sub-BST is fixed, Y is greater than or equal to 1.

Optionally, an on-flag bit is disposed in each of the BST sub-TLVs; and the on-flag bit being on represents that the set BST sub-TLV with the on-flag bit being on is a bottom BST sub-TLV.

Optionally, an extension flag bit is packaged in the BIER message; and the extension flag bit being on represents that a BST sub-TLV is packaged in the BIER message.

The forwarding table identifier uniquely corresponds to a set composed of SDs, BSLs and SIs of the BST.

The package format of a BST sub-TLV in the embodiments of the present disclosure is specifically described below by examples.

Figure 3:
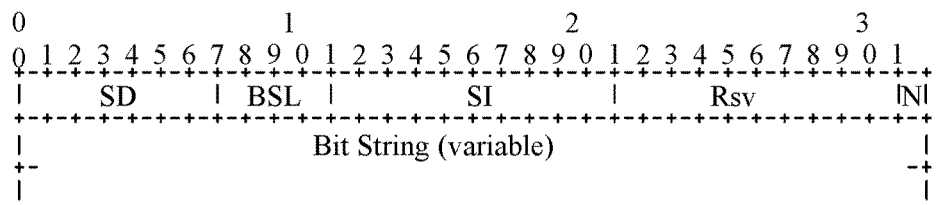
FIGS. 3 to 17 are schematic diagrams of a package format of a bit string sub-TLV according to embodiments of the present disclosure.

As shown in FIG. 3, a package format 1 includes fields, such as an SD (e.g., an SD ID), a BSL and an SI as well as sub-BSTs (also called BitString); and of course, it may also include an on-flag bit N. When N is on, it means that the sub-TLV is a bottom TLV. It is to be noted that "sub-" added in front of the BST in the embodiments of the present disclosure is only used for distinguishing from the bit strings corresponding to a set of index parameters (the bit string corresponding to a set of index parameters herein is referred to as a bit string or a BST), and thus the "sub-" has no specific meaning.

The sub-BST is variable, and the length of the sub-BST is set by a length of the field BST in the sub-TLV. In this case, each BST sub-TLV carries a BST.

Figure 4:
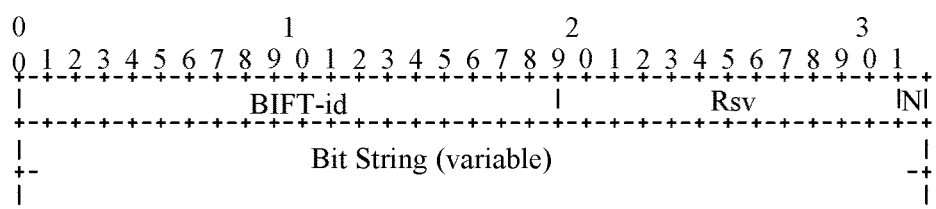

As shown in FIG. 4, a package format 2 includes fields, such as a BIER message forwarding table identifier (BIFT-id) and sub-BSTs; in this format, an SD ID, a BSL and an SI are used as globally unique variables of a key value, which is the same as a node side BIFT ID; and of course, the format may also include an on-flag bit N. When N is on, it means that the sub-TLV is a bottom TLV.

The sub-BST is variable, and the length of the sub-BST is specified by a BSL corresponding to the field BIFT-id in the sub-TLV. In this case, each BST sub-TLV carries a BST.

Figure 5:
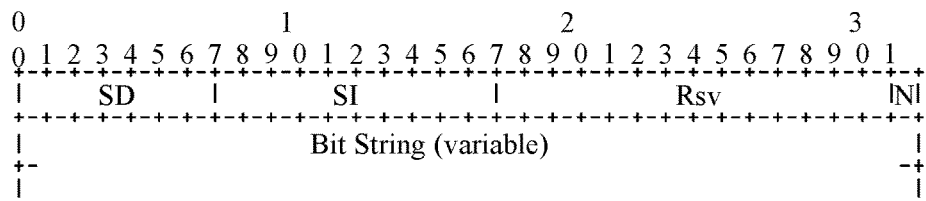

As shown in FIG. 5, a package format 3 includes fields, such as an SD and an SI as well as sub-BSTs; and of course, it may also include an on-flag bit N. When N is on, it means that the sub-TLV is a bottom TLV.

The sub-BST is variable, and the length of the sub-BST is set by the field BSL in a BIER package header. In this case, each BST sub-TLV carries a BST, and sub-BSTs in all BST sub-TLVs have the same BSL.

Figure 6:
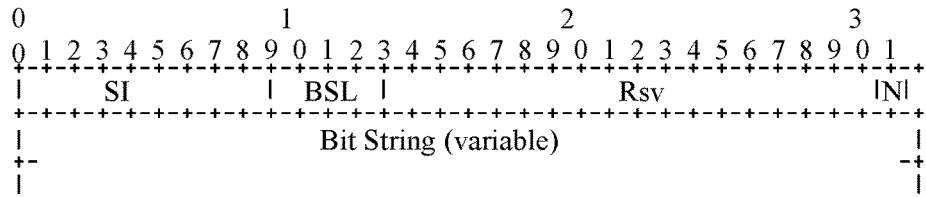

As shown in FIG. 6, a package format 4 includes fields, such as an SI and a BSL as well as sub-BSTs; and of course, it may also include an on-flag bit N. When N is on, it means that the sub-TLV is a bottom TLV.

The sub-BST is variable, and the length of the sub-BST is set by the field BSL in the sub-TLV. SD information corresponding to the BST is represented by the BIER-id in the BIER package header. In this case, each BST sub-TLV carries a BST, and sub-BSTs in all BST sub-TLVs have the same SD.

Figure 7:
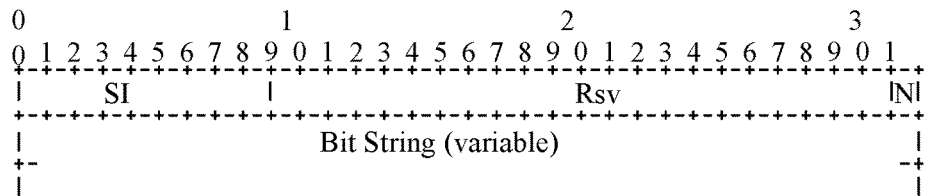

As shown in FIG. 7, a package format 5 includes fields, such as an SI as well as sub-BSTs; and of course, it may also include an on-flag bit N. When N is set, it means that the sub-TLV is a bottom TLV.

The sub-BST is variable, and the length of the sub-BST is set by the field BSL in the BIER package header. The SD information corresponding to the BST is represented by the BIER-id in the BIER package header. In this case, each BST sub-TLV carries a BST, and BSTs in all BST sub-TLVs have the same SD and the same BSL.

Figure 8:
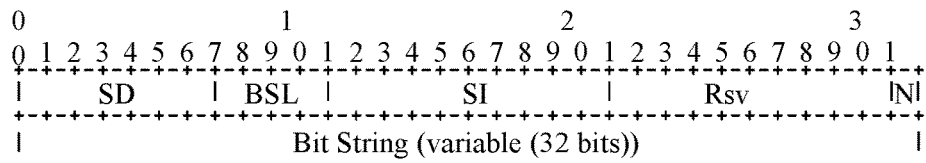

As shown in FIG. 8, a package format 6 includes fields, such as an SD, a BSL and an SI as well as sub-BSTs; and of course, it may also include an on-flag bit N. When N is set, it means that the sub-TLV is a bottom TLV.

The sub-BST has a fixed length and the length is a fixed value, i.e., 32 bits. In this case, one BST may be represented by multiple BST sub-TLVs.

Figure 9:
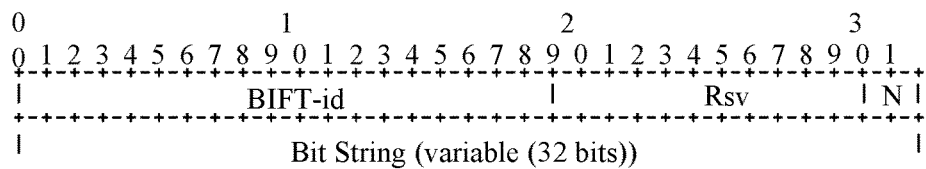

As shown in FIG. 9, a package format 7 includes fields, such as a BIFT-id and sub-BSTs; fields, such as an ID, a BSL and an SI, are used as globally unique variables of a key value, which is the same as a node side BIFT ID; and of course, the format may also include an on-flag bit N. When N is set, it means that the sub-TLV is a bottom TLV.

The sub-BST has a fixed length and the length is a fixed value, i.e., 32 bits. In this case, one BST may be represented by multiple BST sub-TLVs.

Figure 10:
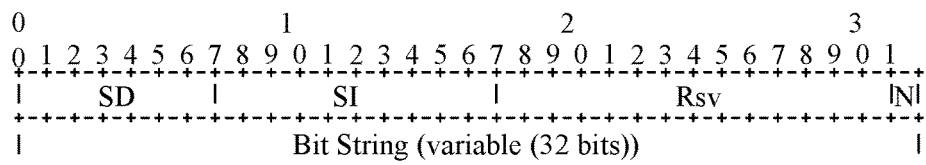

As shown in FIG. 10, a package format 8 includes fields, such as an SD and an SI as well as sub-BSTs; and of course, it may also include an on-flag bit N. When N is on, it means that the sub-TLV is a bottom TLV.

The sub-BST has a fixed length and the length is a fixed value, i.e., 32 bits. One BST may be represented by multiple BST sub-TLVs. The length of the BST is represented by the BSL in the BIER message package, and in this case, all BSTs in the BIER header have the same BSL.

Figure 11:
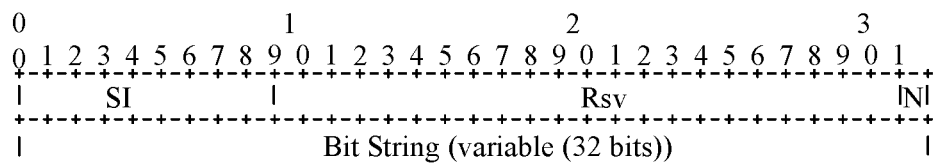

As shown in FIG. 11, a package format 9 includes fields, such as an SI as well as sub-BSTs; and of course, it may also include an on-flag bit N. When N is on, it means that the sub-TLV is a bottom TLV.

The sub-BST has a fixed length and the length is a fixed value, i.e., 32 bits.

One BST may be represented by multiple BST sub-TLVs. The SD information and BSL information corresponding to the BST are represented by the BIER-id in the BIER package header. In this case, sub-BSTs in all BST sub-TLVs have the same BSL and the same SD.

Figure 12:
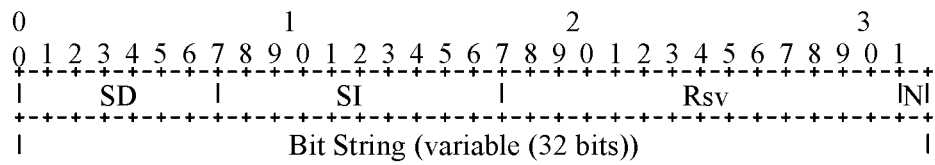

As shown in FIG. 12, a package format 10 includes fields, such as an SD and an SI as well as sub-BSTs; and of course, it may also include an on-flag bit N. When N is on, it means that the sub-TLV is a bottom TLV.

The sub-BST has a fixed length and the length is a fixed value, i.e., 32 bits. One BST may be represented by multiple BST sub-TLVs. In this case, all BSTs in the BIER header have the same SD.

Figure 13:
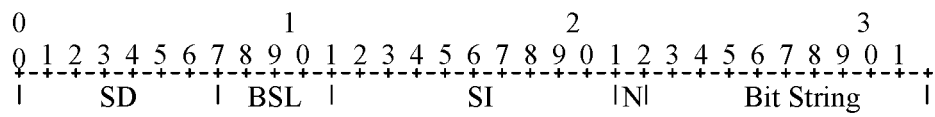

As shown in FIG. 13, a package format 11 includes fields, such as an SD, a BSL, an SI, sub-BSTs and an on-flag bit N.

The sub-BST has a fixed length and the specific length value is not specified in the figure. In this case, one BST may be represented by multiple BST sub-TLVs.

Figure 14:
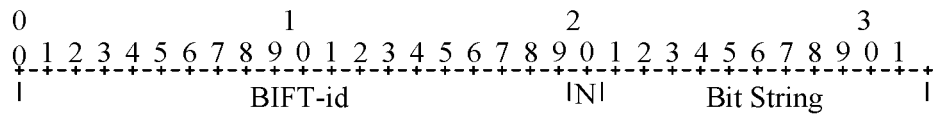

As shown in FIG. 14, a package format 12 includes fields, such as a BIFT-id and sub-BSTs; fields, such as an SD ID, a BSL and an SI, are used as globally unique variables of a key value, which is the same as a node side BIFT ID; and of course, the format may also include an on-flag bit N. When N is set, it means that the sub-TLV is a bottom TLV.

The sub-BST has a fixed length and the specific length value is not specified in the figure. In this case, one BST may be represented by multiple BST sub-TLVs.

Figure 15:
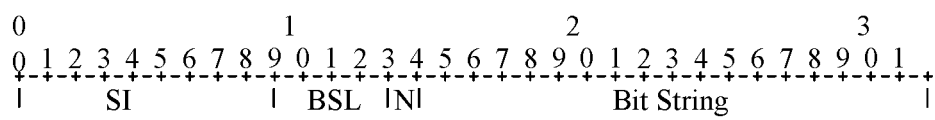

As shown in FIG. 15, a package format 13 includes fields, such as an SI, a BSL, an on-flag bit N and sub-BSTs. The sub-BST has a fixed length and the specific length value is not specified in the figure.

One BST may be represented by multiple BST sub-TLVs. The SD information and the BSL information corresponding to the BST are represented by the BIER-id in the BIER package header. In this case, sub-BSTs in all BST sub-TLVs have the same BSL and the same SD.

Figure 16:
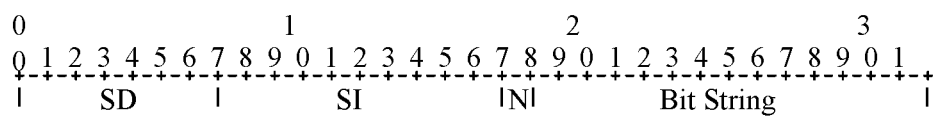

As shown in FIG. 16, a package format 14 includes fields, such as an SD ID, an SI, an on-flag bit N and sub-BSTs.

The sub-BST has a fixed length and the specific length value is not specified in the figure. One BST may be represented by multiple BST sub-TLVs. The length of the BST is represented by the BSL in the BIER message package, and in this case, all BSTs in the BIER header have the same BSL.

Figure 17:
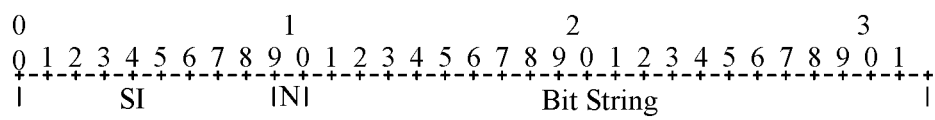

As shown in FIG. 17, a package format 15 includes fields, such as an SI, an on-flag bit N and sub-BSTs.

The sub-BST has a fixed length and the specific length value is not specified in the figure.

One BST may be represented by multiple BST sub-TLVs. The SD information and the BSL information corresponding to the BST are represented by the BIER-id in the BIER package header. In this case, sub-BSTs in all BST sub-TLVs have the same BSL and the same SD.

The package format of the BIER message is described by an example.

Figure 18:
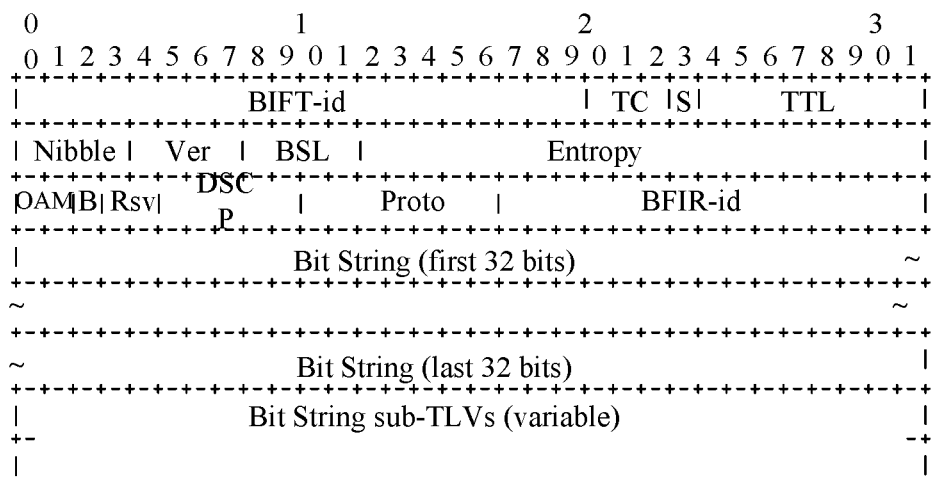
FIG. 18 is a schematic diagram of a package format of a BIER message header according to an embodiment of the present disclosure.

As shown in FIG. 18, an extension flag bit B is disposed in the BIER package format to represent that the BIER header carries BST sub-TLVs.

In other words, adding a BST sub-TLV field in the BIER(TE) message package format represents it is a BST sub-TLV. One or more BST-TLVs correspond to a set of <SD:BSL:SI>. One BIER(TE) head may carry multiple BST sub-TLVs. A bit position B is newly added, and B being set represents that the package message carries the BSL-TLV; otherwise, the message is forwarded in a default manner.

Optionally, the step in which the message is forwarded according to the X BST sub-package structures includes steps described below.

For each BST sub-TLV:
an index parameter and a sub-BST in the bit string sub-TLV are acquired;
a BIER message forwarding table of a node is searched, and forwarding table items corresponding to the index parameter are combined into a BST;
AND operation is performed on the combined BST and the sub-BST to obtain a bit position that is not 0; and
the bit position that is not 0 is traversed in the BIER message forwarding table of the node, and for any bit position that is not 0, the message forwarding is performed according to an adjacency type of the bit position that is not 0.

After the message forwarding is performed according to the adjacency type of the bit position that is not 0, the method may further include a step: clearing the nit position that is not 0.

Optionally, a on-flag bit is disposed in each of the BST sub-TLVs; and the on-flag bit being on represents that the set BST sub-TLV is a bottom BST sub-TLV.

Furthermore, after the message forwarding is performed to the adjacency type of the bit position that is not 0, the method further includes steps described below.

Whether the on-flag bit in the BST sub-TLV is on is determined.

If the on-flag bit in the bit string sub-TLV is on, the message forwarding is finished.

If the on-flag bit in the bit string sub-TLV is not on, a next BST sub-TLV is acquired, and an index parameter and a sub-bit string in the next bit string sub-TLV are acquired.

Optionally, an extension flag bit is packaged in the BIER message; and the extension flag bit is used for representing that a BST sub-TLV is packaged in the BIER message.

Before the X BST sub-package structures are acquired from the BIER-TE message, the method may further include steps described below.

Whether the extension flag bit is packaged in the BIER message is determined.

When the extension flag bit is determined to be packaged, X BST sub-TLVs are acquired from the BIER message.

This embodiment is described below by an example.

Figure 1:
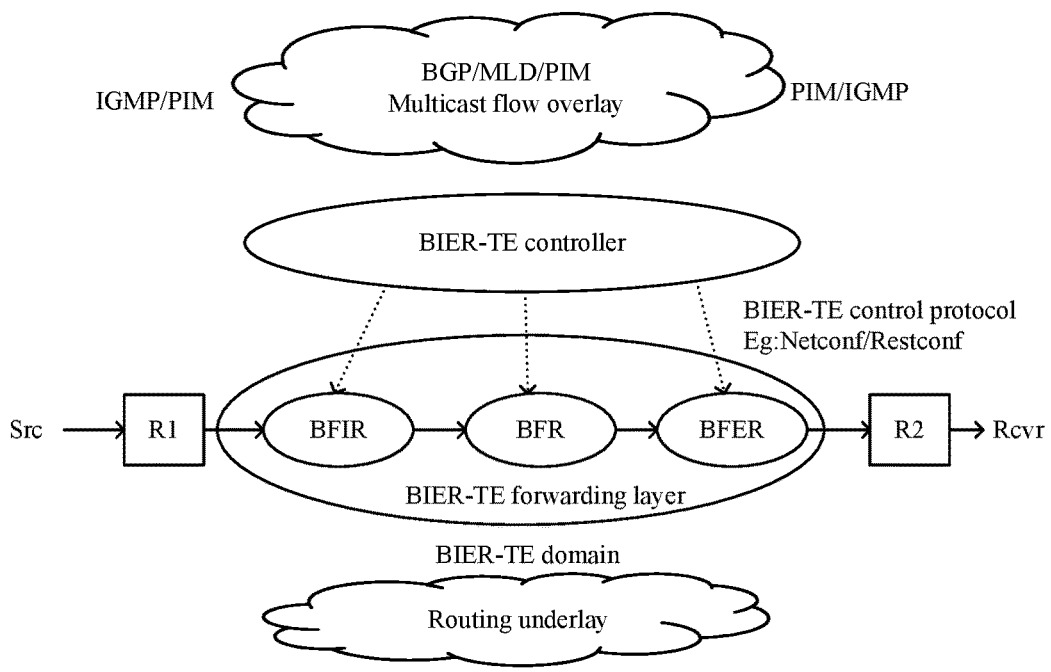
FIG. 1 is a schematic diagram of a BIER-TE hierarchy architecture.

In a BIER-TE hierarchy structure as shown in FIG. 1, functions of a Multicast Flow OverLay application and a Routing Underlay application are the same as the function of the BIER. A BIER-TE controller host, used as a BIER-TE control plane, receives a multicast flow configuration via Restconf, discovers a network topology via Nteconf or other southbound protocols, allocates BPs and configures a generated forwarding table to a BFR.

A BIER-TE forwarding layer searches a BP of a BST in the BIFT, and forwards the message to a corresponding adjacency. After receiving multicast flow configuration BFIR and BFER information, the controller calculates optimal paths from the BFIR to all BFERs via a path calculation function respectively, combines all paths, deletes repeated paths to obtain an optimal path from the BFIR to all BFERs, searches BPs corresponding to an adjacent point passed by this path, groups the BPs with <SD:BSL:SI> as an index, generates a corresponding BST linked list, and sends the BST linked list to the BFIR via a south protocol. The BFIR generates a BIER package message carrying BST sub-TLVs as shown in FIG. 18 according to the BST linked list, and forwards the message to the BFR.

Figure 19:
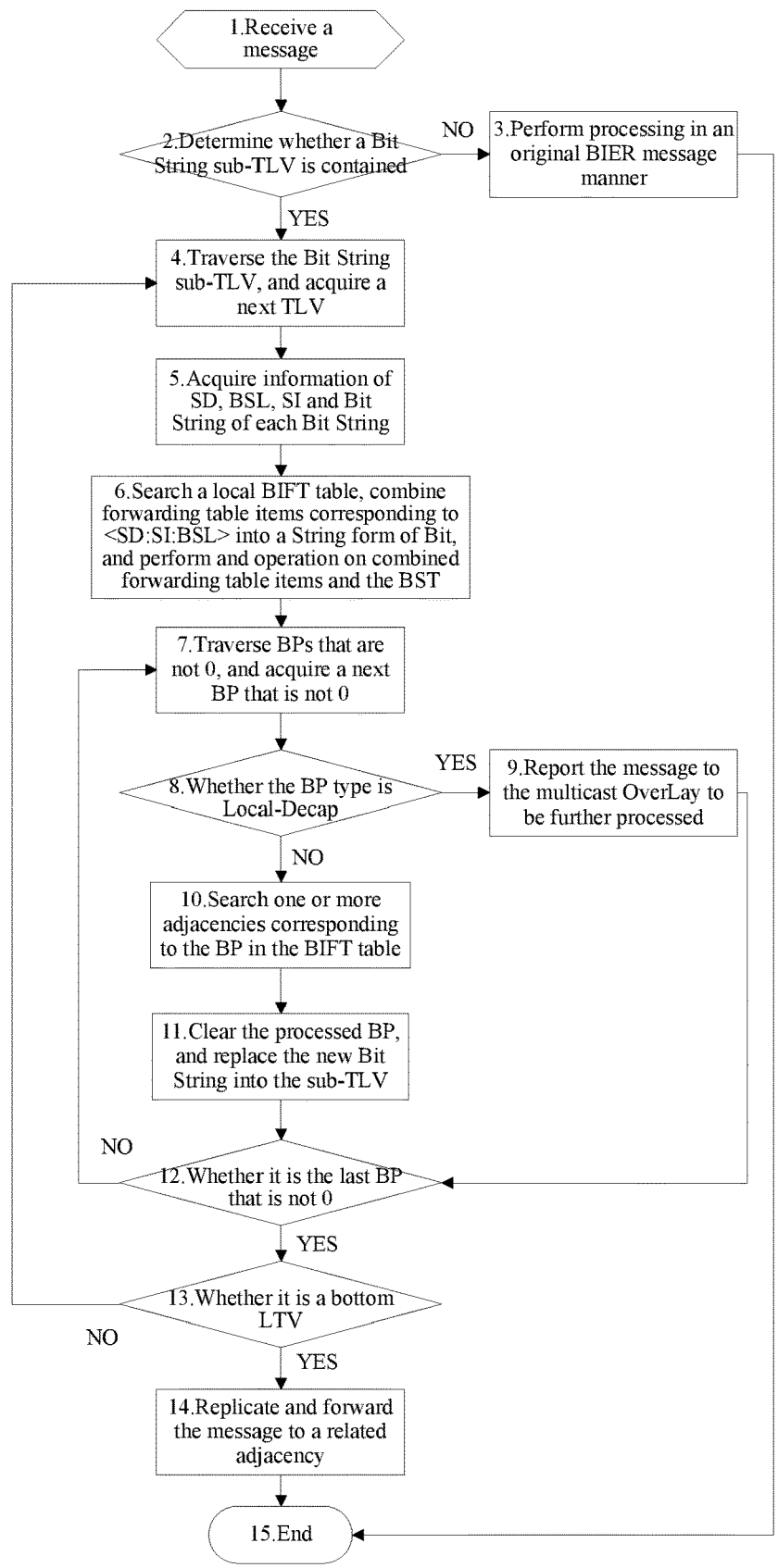
FIG. 19 is a flowchart of a packet forwarding method based on BIER-TE according to an optional embodiment of the present disclosure.

As shown in FIG. 19, a packet forwarding method based on BIER-TE in this example incudes steps 1 to 15.

In step 1, the BFR receives a BIER package message.

In step 2, whether a BST sub-TLV (referred to as the sub-TLV for short) is contained is determined. If there is no BST sub-TLV, go to step 3. If there is the BST sub-TLV, go to step 4.

In step 3, the message is forwarded according to an original BIER package format, and after the forwarding is completed, go to step 15.

In step 4, BST sub-TLVs are traversed, and a next BST sub-TLV is acquired.

In step 5, information, such as an SD, an SI, a BSL and a BST, in the sub-TLV is acquired.

In step 6, a BIFT of the current node is searched, forwarding table items corresponding to <SD:SI:BSL> are combined into a string form of Bit, and AND operation is performed on the combined forwarding table items and the BST to search a BP that is not 0.

In step 7, BPs that are not 0 are traversed in the BIFT to acquire a next BP that is not 0, and the message forwarding is performed to an adjacency type of this BP.

In step 8, whether the BP type is Local-Decap is determined.

In step 9, if the BP type is Local-Decap, which means that the message needs to be forwarded to the BFR itself, i.e., a BFER node, the message must be locally reported to the multicast OverLay to be further processed, and then go to step 12.

In step 10, if the BP type is other types other than Local-Decap, which means that the message needs to continue to be forwarded, one or more adjacencies that correspond to the BP and need to forward the message are searched in the BIFT.

In step 11, the above processed BPs that are not 0 in the BST are cleared, and the processed BST is replaced into the sub-TLV, which specifically is to perform the negation operation on results obtained after the AND operation and then perform the AND operation on the obtained results and the BST to obtain a new BST. If all BPs of this BST are 0, a BST sub-TLV corresponding to this BST is deleted; otherwise, a BST in this BST sub-TLV is replaced with this BST.

In step 12, whether the BP is the last BP that is not 0 is determined. If it is the last BP that is not 0, go to step 13; otherwise, go to step 7.

In step 13, whether the TLV is the bottom TLV is determined according to the on-flag bit in the TLV. If it is not the bottom TLV, a next sub-TLV is acquired, and go to step 4; otherwise, go to step 14.

In step 14, according to the processing results, the message is replicated and forwarded to a related adjacency or reported to the OverLay to be further processed.

In step 15, the message forwarding is completed, and the process ends.

Figure 20:
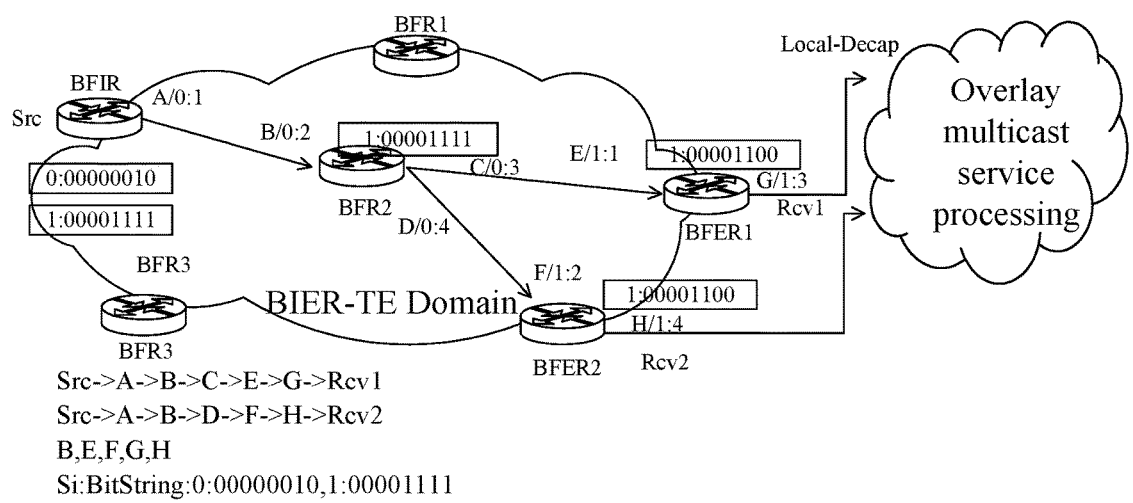
FIG. 20 is a schematic diagram of a BIER-TE-based message forwarding effect according to an embodiment of the present disclosure.

Specifically, as shown in FIG. 20, the BIER-TE domain has nodes BFIR, BFR1, BFR2, BFR3, BFER1 and BFER2. Links and ports between nodes are as follows, and each port, as an adjacency, allocates a BP in the BIER-TE. All BPs have the same SD and BSL, where SD=1 and BSL=8. SI:BP is A→0:1, B→0:2, C→0:3, D→0:4, E→1:1, F→1:2, G→1:3 and H→1:4 respectively. The multicast service specifies the BFIR as an ingress node and the BFER1 and the BFER2 as egress nodes of interest, and calculates optimal paths from the head node to the two tail nodes respectively by using the path calculation algorithm. The optimal paths are as follows:

Src→A→B→C→E→G→Rcv1

Src→A→B→D→F→H→Rcv2

The adjacencies passed by the combined paths are B, E, F, G and H, and two BSTs are divided according to the SI, which are SI:BST: 0:00000010 and 1:00001111. The message forwarding process is described below.

1) The BFIR receives two BST package BIER-TE messages, generates two BST sub-TLVs, traverses the BST sub-TLVs, searches a next adjacency in which SI:BP is 0:2, clears this BP and becomes 1:00001111, and continues to forward the message to the next port B.

2) The port B, after receiving the message, searches next adjacencies E and F, clears the BP that is not 0 and then continues to forward the BSTs as 1:00001100.

3) The port E searches the next adjacency G, the port F searches the next adjacency H, and when the type of these two adjacencies is LOCAL-Decap, the message is reported to the OverLay to be further processed.

The data of the SI, the BP and the BSL is a simple example, and the actual data is set according to network device requirements.

The BIER(TE) message package format can be the package format of the BST sub-TLVs shown in FIG. 3, and the following is the explanations of added fields.

SD(8 bit): representing the BIER SD ID, with the value range [0-255]

SI(10 bit): representing the SI of the BIER, with the value range [0-1023]

BSL(4 bit): representing a bit length (the number of bits) of the BSL, and which can be 1 to 7 described below, where if the bit length of the BST is N, BSL=Log 2(k)−5 can be calculated according to the formula 1: 64 bits;
2: 128 bits;
3: 256 bits;
4: 512 bits;
5: 1024 bits;
6: 2048 bits; and
7: 4096 bits Rsv(9 bit): a reserved field N(1 bit): representing that it is followed by a BIER sub-TLV when this field is set to 0, and representing that it is a bottom sub-TLV when this field is set to 1

BST: a sub-BST, which is variable, and whose length is a length specified by the BSL The BIER(TE) message package format can also be shown in FIG. 4, where the combination of the SD, the BSL and the SI can also be specified by the BIER-id, and fields, such as the SD ID, the BSL and the SI, are used as globally unique variables of a key value, which is the same as a node side BIFT ID.

The BIER(TE) message package format can also be shown in FIGS. 5 to 7, where the SD can be fixed, or the BSL can be fixed, or the BD and the BSL can be fixed simultaneously, and the SD, the SI and the BSL are only specified to be acquired by the BIFT-id in the original BIER package header by searching a local BIFT table of the node.

Of course, the BIER(TE) message package format can be the package format of the BST sub-TLVs shown in FIG. 8 (or FIG. 13), where the explanations of fields, such as the SD, the BSL, the SI and the N are as above. The BST is a sub-BST, has a fixed length and the length is specified as 32 bits.

The BIER(TE) message package format can also be shown in FIG. 9 (or FIG. 14), where the combination of the SD, the BSL and the SI can also be specified by the BIER-id, and fields, such as the SD ID, the BSL and the SI, are used as globally unique variables of a key value, which is the same as a node side BIFT ID.

The BIER(TE) message package format can also be shown in FIGS. 10 to 12 (or FIGS. 15 to 17), where the SD can be fixed, or the BSL can be fixed, or the BD and the BSL can be fixed simultaneously, and the SD, the SI and the BSL are only specified to be acquired by the BIFT-id in the original BIER package head by searching the local BIFT table of the node.

Embodiment Two

Figure 21:
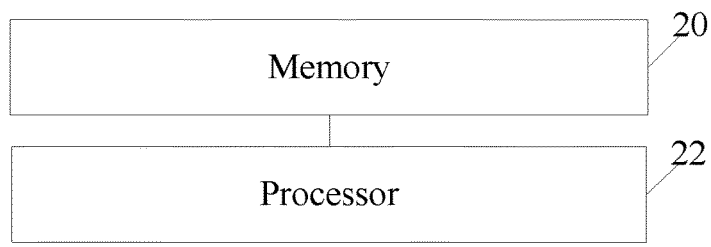
FIG. 21 is a structural diagram of a packet forwarding node device based on BIER-TE according to an embodiment of the present disclosure.

This embodiment provides a packet forwarding node device based on BIER-TE. As shown in FIG. 21, the device includes a memory 20 and a processor 22. The memory 20 is configured to store BIER-TE-based message forwarding computer programs, and the processor 22 is configured to execute the computer programs to implement steps described below.

X BST sub-package structures are acquired from a BIER-TE message.

The message is forwarded according to the X BST sub-package structures, where X is greater than or equal to 1.

The node device in this embodiment can be any one of nodes described in the Background.

This embodiment acquires X BST sub-package structures from a BIER-TE message and forwards the message according to the X BST sub-package structures, thereby implementing a new message package format, making the BIER message carry multiple BSTs, overcoming the limitation in which one BIER message must have the same index parameter and BST, effectively resolving the problem of limited resource allocation in the BST in the BIER-TE, and improving flexibility of message package, thus improving the message forwarding efficiency.

On the basis of the above embodiment, variant embodiments of the above embodiment are further proposed, and it is to be noted that herein, for the brevity of description, only differences from the above embodiment will be described in the variant embodiments.

Optionally, the BST sub-package structure is a BST sub-TLV.

Before the X BST sub-package structures are acquired from the BIER-TE message, the following steps can be included.

A BST linked list for forwarding the message is acquired.

X BST sub-TLVs are generated according to the BST linked list.

The X BST sub-TLVs are packaged in the BIER message.

Furthermore, the step in which the X BST sub-TLVs are packaged in the BIER message includes a step described below.

The X BST sub-TLVs are packaged in a preset extension area of the BIER message.

Optionally, Y BST sub-TLVs correspond to a BST corresponding to a set of index parameters, where Y is greater than or equal to 1, and Y is less than or equal to X; the set of index parameters is a set composed of SDs, BSLs and SIs, or is a BIER message forwarding table identifier corresponding to the BST; and each BP in the BST identifies one or more adjacencies. The BIER message forwarding table identifier uniquely corresponds to a set composed of SDs, BSLs and SIs.

Furthermore, any one of the BST sub-TLVs includes a sub-BST and the BIER message forwarding table identifier, or includes a sub-BST and at least one index parameter in the set composed of SDs, BSLs and SIs; and Y sub-BSTs compose one BST.

Specifically, the at least one index parameter includes an SD, a BSL and an SI, or includes an SD and an SI, or includes an SI and a BSL, or includes an SI.

Optionally, when the number of index parameters in the BST sub-TLV is less than 3, the set of index parameters is determined by the BIER message forwarding table identifier, the BSL and/or the SI carried by the BIER message.

Specifically, the step in which when the number of index parameters in the BST sub-TLV is less than 3, the set of index parameters is determined by the BIER message forwarding table identifier, BSL information and/or the SI carried by the BIER message includes steps described below.

When an index parameter in the BST sub-TLV is an SD and an SI, the BSL in the set of index parameters is set by the BSL information carried by the BIER message.

When an index parameter in the BST sub-TLV is an SI and a BSL, the SD in the set of index parameters is set by the BIER message forwarding table identifier carried by the BIER message. When an index parameter in the BST sub-TLV is an SI, the BSL in the set of index parameters is set by the BSL information carried by BIER message, and the SD in the set of index parameters is set by the BIER message forwarding table identifier carried by the BIER message. Furthermore, when the BSL in the set of index parameters is set by the BSL information carried by the BIER message, all BST sub-TLVs in each BIER message have the same BSL.

When the SD in the set of index parameters is set by the BIER message forwarding table identifier carried by the BIER message, all BST sub-TLVs in each BIER message have the same SD.

When the BSL in the set of index parameters is set by the BSL information carried by the BIER message, and when the SD in the set of index parameters is set by the BIER message forwarding table identifier carried by the BIER message, all BST sub-TLVs in each BIER message have the same BSL and the same SD.

Optionally, any one of the BST sub-TLVs includes a BST and a BIER message forwarding table identifier, and Y sub-BSTs compose one BST.

The index parameter corresponding to the BST uniquely corresponds to the BIER message forwarding table identifier in the BST sub-package structure.

Optionally, a length of the sub-BST is variable or fixed.

When the length of the sub-BST is variable, Y is equal to 1.

When the length of the sub-BST is fixed, Y is greater than or equal to 1.

Optionally, the step in which the message is forwarded according to the X BST sub-package structures includes steps described below.

For each BST sub-TLV:
  an index parameter and a sub-BST in the bit string sub-TLV are acquired;
  a BIER message forwarding table of a node is searched, and forwarding table items corresponding to the index parameter are combined into a BST;
  AND operation is performed on the combined BST and the sub-BST to obtain a bit position that is not 0; and
  the bit position that is not 0 is traversed in the BIER message forwarding table of the node, and for the bit position that is not 0, the message forwarding is performed to an adjacency type of the bit position that is not 0.

After the message forwarding is performed to the adjacency type of the bit position that is not 0, the following step is further included.

The bit position that is not 0 is cleared.

A on-flag bit is disposed in each of the BST sub-TLVs; and the on-flag bit being on represents that the set BST sub-TLV is a bottom BST sub-TLV.

Furthermore, after the message forwarding is performed to the adjacency type of the bit position that is not 0, the following steps are further included.

Whether the on-flag bit in the BST sub-TLV is set is determined.

If the on-flag bit in the bit string sub-TLV is set, message forwarding is finished.

If the on-flag bit in the bit string sub-TLV is not set, a next BST sub-TLV is acquired, and an index parameter and a sub-BST in the next BST sub-TLV are acquired.

Optionally, an extension flag bit is packaged in the BIER message; and the extension flag bit being on represents that a BST sub-TLV is packaged in the BIER message.

Furthermore, before the X BST sub-package structures are acquired from the BIER-TE message, the following steps are further included.

Whether the extension flag bit is packaged in the BIER message is determined.

When the extension flag bit is determined to be packaged, X BST sub-TLVs are acquired from the BIER message.

Embodiment Three

The embodiments of the present disclosure further provide a computer-readable storage medium. The storage medium is configured to store BIER-TE-based message forwarding computer programs. The computer programs are configured to, when executed by a processor, implement steps of the method in the embodiment one.

The computer-readable storage medium in this embodiment may be a random access memory (RAM), a flash memory, a read only memory (ROM), an erasable programmable ROM (EPROM), an electrically EPROM (EEPROM), a register, a hard disk, a mobile hard disk, a CD-ROM or any other form of storage medium that known in the art. A storage medium may be coupled to the processor such that the processor is able to read information from, and write information to, the storage medium; or the storage medium may be a component of the processor. The processor and the storage medium may be located in a specific integrated circuit. It is to be noted that for specific implantation of the embodiment two and the embodiment three, reference may be made to the embodiment one, both the embodiment two and the embodiment three have the technical effect of the embodiment one, and thus no further details are provided herein.

Although the present application describes specific examples of the present disclosure, those skilled in the art can design variations of the present disclosure without departing from the concepts of the present disclosure. Those skilled in the art also can make various modifications to the present disclosure without departing from the content of the present disclosure under the technical concept of the present disclosure, which also falls within the protection scope of the present disclosure.

What is claimed is:

1. A packet forwarding method based on traffic engineering for bit indexed explicit replication (BIER-TE), comprising:

acquiring X bit string sub-package structures from a BIER-TE based message, wherein X is greater than or equal to 1, and wherein each of the bit string sub-package structures is a bit string sub-type length value (TLV);

forwarding the message according to the X bit string sub-package structures; and before the acquiring the X bit string sub-package structures from the BIER-TE based message, the method comprises:

acquiring a bit string linked list for forwarding the message;

generating X bit string sub-TLVs according to the bit string linked list; and packaging the X bit string sub-TLVs in the BIER-TE based message.

2. The method of claim 1, wherein the packaging the X bit string sub-TLVs in the BIER-TE based message comprises:

packaging the X bit string sub-TLVs in a preset extension area of the BIER-TE based message.

3. The method of claim 1, wherein Y bit string sub-TLVs correspond to a bit string corresponding to a set of index parameters, wherein Y is greater than or equal to 1, and Y is less than or equal to X;

wherein the set of index parameters is a set composed of subdomains, bit string lengths and set identifiers, or is a bit indexed explicit replication message forwarding table identifier corresponding to the bit string; and each bit position in the bit string identifies one or more adjacencies.

4. The method of claim 3, wherein the bit indexed explicit replication message forwarding table identifier uniquely corresponds to a set composed of subdomains, bit string lengths and set identifiers.

5. The method of claim 3, wherein any one of the bit string sub-TLVs comprises a sub-bit string and the bit indexed explicit replication message forwarding table identifier, or comprises a sub-bit string and at least one index parameter in the set composed of subdomains, bit string lengths and set identifiers; and wherein Y sub-bit strings compose one bit string.

6. The method of claim 5, wherein the at least one index parameter comprises a subdomain, a bit string length and a set identifier, or comprises a subdomain and a set identifier, or comprises a set identifier and a bit string length, or comprises a set identifier.

7. The method of claim 5, wherein in condition that a number of index parameters in one bit string sub-TLV in the bit string sub-TLVs is less than 3, determining the set of index parameters according to the bit indexed explicit replication message forwarding table identifier, the bit string length and/or the set identifier carried by the BIER-TE based message.

8. The method of claim 7, wherein in condition that the number of index parameters in the bit string sub-TLV is less than 3, the determining the set of index parameters according to the bit indexed explicit replication message forwarding table identifier, the bit string length and/or the set identifier carried by the BIER-TE based message comprises:

in condition that an index parameter in the bit string sub-TLV is a subdomain and a set identifier, configuring the bit string length in the set of index parameters according to the bit string length carried by the BIER-TE based message;

in condition that an index parameter in the bit string sub-TLV is a set identifier and a bit string length, configuring the subdomain in the set of index parameters according to the bit indexed explicit replication message forwarding table identifier carried by the BIER-TE based message; and in condition that an index parameter in the bit string sub-TLV is a set identifier, configuring the bit string length in the set of index parameters according to bit string length information carried by the BIER-TE based message, and configuring the subdomain in the set of index parameters according to the bit indexed explicit replication message forwarding table identifier carried by the BIER-TE based message.

9. The method of claim 8, further comprising:

when the bit string length in the set of index parameters is configured according to the bit string length information carried by the BIER-TE based message, all bit string sub-TLVs in each BIER-TE based message have a same bit string length;

when the subdomain in the set of index parameters is configured according to the bit indexed explicit replication message forwarding table identifier carried by the BIER-TE based message, all bit string sub-TLVs in each BIER-TE based message have a same subdomain; and when the bit string length in the set of index parameters is configured according to the bit string length information carried by the BIER-TE based message, and when the subdomain in the set of index parameters is configured according to the bit indexed explicit replication message forwarding table identifier carried by the BIER-TE based message, all bit string sub-TLVs in each BIER-TE based message have a same bit string length and a same subdomain.

10. The method of claim 5, wherein a length of the sub-bit string is variable or fixed;

in condition that the length of the sub-bit string is variable, Y is equal to 1; and in condition that the length of the sub-bit string is fixed, Y is greater than or equal to 1.

11. The method of claim 5, wherein the forwarding the message according to the X bit string sub-package structures comprises:

for each bit string sub-TLV of the bit string sub-TLVs, acquiring an index parameter and a sub-bit string in the each bit string sub-TLV;

searching a bit indexed explicit replication message forwarding table of a node, and combining forwarding table items corresponding to the index parameter into a bit string;

performing AND operation on the combined bit string and the sub-bit string to obtain bit positions that are not zero; and traversing the bit positions that are not zero in the bit indexed explicit replication message forwarding table of the node, and for one bit position of the bit positions that are not zero, performing message forwarding according to an adjacency type of the one bit position that is not zero.

12. The method of claim 11, wherein after the performing message forwarding according to the adjacency type of the one bit position that is not zero, the method further comprises:

clearing the one bit position that is not zero.

13. The method of claim 11, wherein an on-flag bit is further configured in the each bit string sub-TLV; and the on-flag bit being on represents that a bit string sub-TLV with the on-flag bit being on is a bottom bit string sub-TLV.

14. The method of claim 13, wherein after the forwarding the message according to the adjacency type of the one bit position that is not zero, the method further comprises:

determining whether the on-flag bit in the each bit string sub-TLV is on;

in condition that the on-flag bit in the each bit string sub-TLV is on, ending message forwarding; and in condition that the on-flag bit in the each bit string sub-TLV is not on, acquiring a next bit string sub-TLV, and acquiring an index parameter and a sub-bit string in the next bit string sub-TLV.

15. The method of claim 1, wherein an extension flag bit is packaged in the BIER-TE based message; and wherein the extension flag bit being on represents that a bit string sub-TLV is packaged in the BIER-TE based message.

16. The method of claim 15, wherein before the acquiring the X bit string sub-package structures from the BIER-TE based message, the method further comprises:

determining whether the extension flag bit is packaged in the BIER-TE based message; and in response to determining that the extension flag bit is packaged in the BIER-TE based message, acquiring X bit string sub-TLVs from the BIER-TE based message.

17. A packet forwarding node device based on traffic engineering for bit indexed explicit replication (BIER-TE), comprising a memory and a processor, wherein the memory is configured to store BIER-TE-based message forwarding computer programs, and the processor is configured to execute the computer programs to implement following steps:

acquiring X bit string sub-package structures from a BIER-TE based message, wherein X is greater than or equal to 1, and wherein each of the bit string sub-package structures is a bit string sub-type length value (TLV);

forwarding the message according to the X bit string sub-package structures; and before the acquiring the X bit string sub-package structures from the BIER-TE based message, the method comprises:

acquiring a bit string linked list for forwarding the message;

generating X bit string sub-TLVs according to the bit string linked list; and packaging the X bit string sub-TLVs in the BIER-TE based message.

18. A non-transitory computer-readable storage medium, which is configured to store message forwarding computer programs based on traffic engineering for bit indexed explicit replication (BIER-TE), wherein the computer programs are configured to, when executed by a processor, perform:

acquiring X bit string sub-package structures from a BIER-TE based message, wherein X is greater than or equal to 1, and wherein each of the bit string sub-package structures is a bit string sub-type length value (TLV);

forwarding the message according to the X bit string sub-package structures; and before the acquiring the X bit string sub-package structures from the BIER-TE based message, the method comprises:

acquiring a bit string linked list for forwarding the message;

generating X bit string sub-TLVs according to the bit string linked list; and packaging the X bit string sub-TLVs in the BIER-TE based message.

\* \* \* \* \*